Dec. 22, 1959  D. McCARTHY  2,917,862
MULTI-PURPOSE DEVICE FOR FISHING ACCESSORIES
Filed Dec. 4, 1957  2 Sheets-Sheet 2
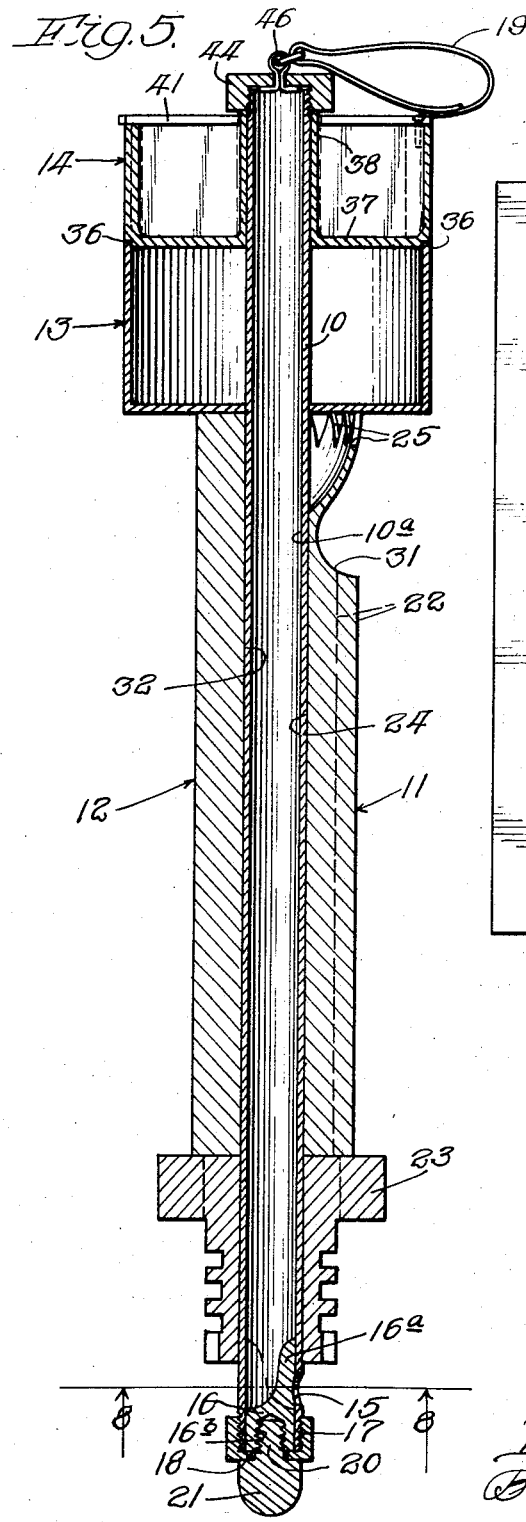
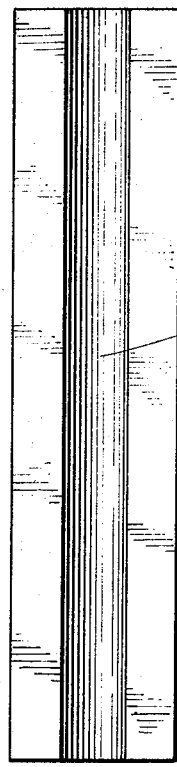
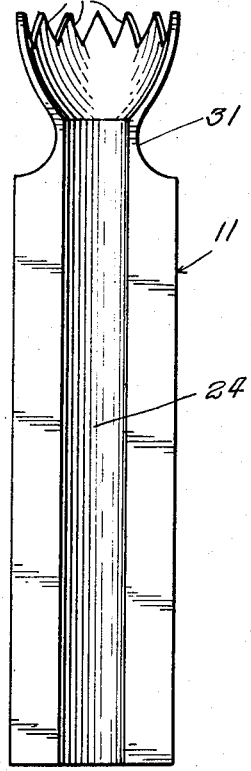
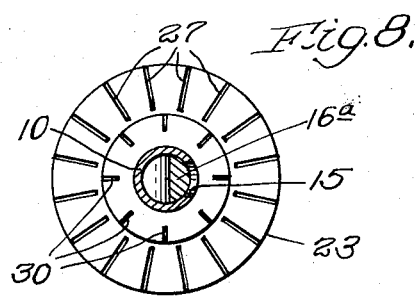

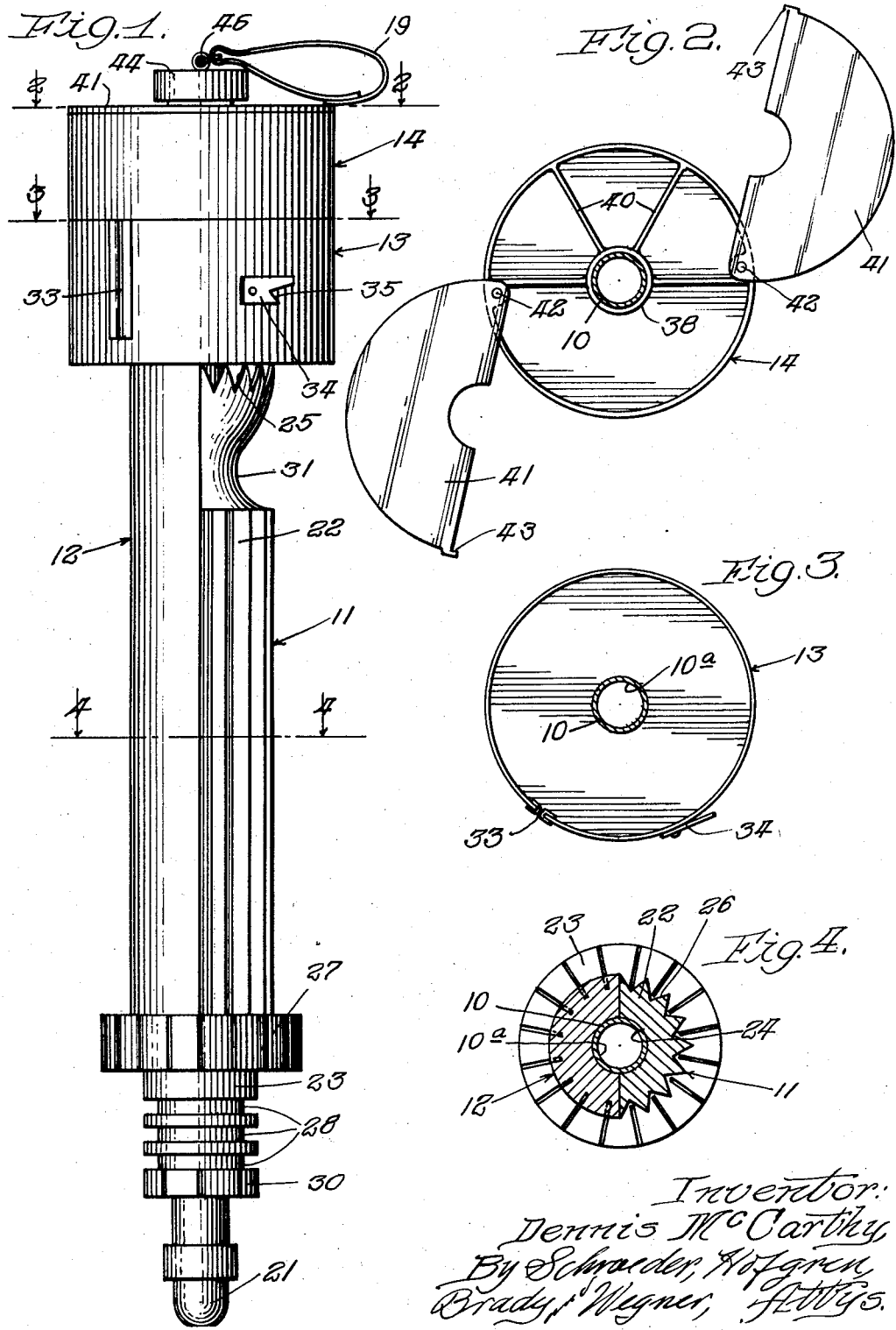

United States Patent Office 2,917,862
Patented Dec. 22, 1959

2,917,862
MULTI-PURPOSE DEVICE FOR FISHING ACCESSORIES

Dennis McCarthy, Bakersfield, Calif.

Application December 4, 1957, Serial No. 700,708

5 Claims. (Cl. 43—54.5)

The present invention relates to a multi-purpose device for fishing accessories, and more particularly to such a device of a size to be conveniently carried upon the person for holding frequently needed fishing accessories in a readily accessible manner.

In the past, fishing accessories have normally been carried by anglers in a tackle box. Fresh water fishermen frequently find it necessary to replace or change the type of bait, hook, lure or sinker being used in order to cope with a particular fishing situation. Such changes necessitate the location of the proper fishing accessory in the relatively inaccessible confines of the tackle box. In addition, when walking in backwoods country, or when wading a stream, it is inconvenient and cumbersome to carry the conventional tackle box. The need for a light, compact holder which can be attached to the person and which will render oft-used fishing accessories readily available has long been apparent. The present invention obviates the objections associated with the ordinary tackle box, and provides a readily accessible and compact holder unit for a complete line of fishing accessories such as leaders, snelled hooks, barbed hooks, lures, flies and various types of baits.

The primary object of the present invention is to provide a new and improved device for holding varying types of fishing accessories.

Another object is to provide a device embodying several types of holders uniquely arranged in a compact unit.

A further object is to provide a multi-purpose device for fishing accessories, the device having a support member which mounts a plurality of holder elements and serves as a receptacle and dispenser for sinker elements.

The invention is illustrated in a preferred embodiment in the accompanying drawings, in which:

Fig. 1 is a side elevational view illustrating the preferred arrangement of the holder elements;

Fig. 2, a sectional view taken as indicated on line 2—2 of Fig. 1, and showing the cover members in open position;

Fig. 3, a sectional view taken as indicated on line 3—3 of Fig. 1;

Fig. 4, a sectional view taken as indicated on line 4—4 of Fig. 1;

Fig. 5, a sectional view of the device in the position illustrated in Fig. 1;

Fig. 6, a side elevational view of the barbed hook holder which embraces part of the central portion of the device;

Fig. 7, a side elevational view of the portion of the snelled hook holder; and

Fig. 8, a sectional view taken as indicated on line 8—8 of Fig. 5.

In the embodiment illustrated, a central tubular support member 10 conveniently mounts a snelled hook retainer, generally designated 11, a barbed hook holder, generally designated 12, a leader spool receptacle, generally designated 13, and a bait container, generally designated 14. Each of the portions, except barbed hook holder 12, is preferably formed of a plastic material, such as polystyrene. A spring latch 19 may be secured to the upper end of the support member 10 so that the device may be detachably secured and suspended from a part of a fisherman's apparel.

The support member 10 is preferably used to accommodate split shot sinkers or other sinker elements in its interior 10a, and to this end, it is provided with an aperture 15 near its lower end. The aperture is normally closed by a scoop-shaped upper portion 16a of a closure member 16 which makes a close fit with the inner rounded surface of the support member 10. A centrally-apertured, cup-shaped nut 17 is preferably threaded on the lower end of the support member 10 and is provided with an inwardly projecting annular shoulder 18 which bears against and holds the closure member 16 within the support member 10. The lower end of the closure member 16 is tapped at 16b so as to threadably receive the shank of a bolt 20 which fits through the apertured nut 17.

The bolt preferably has an enlarged head 21 bearing against the nut 17 and providing a member adapted to be conveniently grasped and turned when desired. In order to open the scoop-shaped portion 16a of the closure member 16, the bolt 20 is fully advanced into the tapped portion of the closure member 16 whereupon further turning of the bolt, counterclockwise as seen in Fig. 5, turns the scoop-shaped portion 16a from in front of the aperture 15. Further turning of the bolt in the same direction will fully rotate the closure member 16 so that the portion 16a is once again in front of the aperture 15.

The snelled hook retainer 11 is preferably permanently secured to the support member 10 and may extend from just above the aperture 15 upwardly toward the leader receptacle 13. It includes an upper snelled hook receiving portion 22 and a lower snell receiving spool 23 which may be formed of plastic or medium-hard rubber. The portion 22 is generally arcuately shaped in cross-section and has a central channel 24 which makes a snug fit with the lateral surface of the support member 10 to which it is secured. The upper end of the portion 22 may be provided with notches 25 for receiving the hooks, and its outer surface has a plurality of longitudinally extending flutes 26 below each notch (best seen in Fig. 4) for accommodating the snells.

The upper end of the spool 23 preferably projects radially outwardly from the support member 10 and is provided with a number of narrow slits 27, as shown in Fig. 8. Thus a number of snelled hooks can be hooked into the notches 25, the snells can be stretched taut within the protective confines of the flutes 26, and the free ends of the snells can be anchored in the slits 27 of the spools 23. If the snells are quite long, each of the free ends may be wound about annular channels 28 of the spool 23 and the free end finally anchored in one of the secondary slits 30 at the lower end of the spool 23. As best seen in Fig. 5, the upper end of the hook-receiving portion 22 is dished or recessed, as at 31, so that the hooks can be easily grasped in the fingers when positioned on, or removed from, the snelled hook retainer 11.

Barbed hooks and lures can also be conveniently secured to the present device in a readily accessible location. The barbed hook holder 12 is preferably positioned opposite the snelled hook retainer 11, as shown in Figs. 1 and 5. The holder 12 is generally arcuately shaped in cross-section, and is provided with a central groove 32 which receives the outer surface of the support member 10 in the same manner as described above in relation to the retainer 11. The holder 12 may be formed of cork, foam rubber, or foam plastic or any other material which will securely anchor an ordinary barbed hook or the hook of a fishing lure.

The leader spool receptacle 13 provides a convenient housing for spools of fish line of varying test strengths. It may be positioned immediately above the retainer 11 and holder 12, and is preferably fixedly secured to the support member 10 which passes centrally through the bottom of the receptacle to form an annular chamber for leader spools. The illustrated receptacle 13 is of a size to receive a number of ordinary spools of leader line, and is provided with an elongated reinforced opening 33 in its lateral surface through which the free ends of each type of leader line may be drawn. The lateral surface of the leader receptacle 13 may also be provided with a knife blade 34 of resilient metal which is riveted in place so that the free ends of the leader may be anchored between the metal and the receptacle until needed. When additional leader line is needed, a length of line can be drawn outwardly from the leader spool through the opening 33, and be severed by the knife edge 35 of the knife blade 34.

The bait container 14, best shown in Figs. 2 and 5, is located immediately above the leader receptacle 13, and is provided with a central hub 38 which makes a close sliding fit with the upper end of the support member 10. Radial walls 40 may be provided emanating from the hub 38 to divide the container into separate compartments for varying kinds of baits such as flies, salmon eggs, worms or the like. The bottom of the container 14 preferably has an annular shoulder 36 which rests upon the upper edge of the side wall of the receptacle 13 so that the bottom 37 of the container 14 serves as a lid for the leader receptacle 13. The open upper end of the container 14 is preferably closed by a pair of swingable cover members 41 pivoted to the container at 42 and provided with conventional friction catches 43 which retain the covers in closed position.

The upper end of the support member 10 may be closed by a cap member 44 threadably received thereon. As best seen in Fig. 5, when the cap member is rotatably advanced, the inner end of the cap member engages the upper end of the hub 38 to press the container 14 securely against the leader receptacle 13. The cap member may have an eyelet 46 for accommodating an end of the spring latch 19.

In its assembled state, the device may be conveniently hung from the belt by the spring latch 19, or it may be carried in an enlarged pocket of a field coat. The device is compact and lightweight, yet it provides ready accessibility to all of the oft-used accessories needed by the fresh water fisherman.

The foregoing detailed description is given for clearness of understanding only and no unnecessary limitations should be understood therefrom, for some modifications will be obvious to those skilled in the art.

I claim:

1. A multi-purpose fishing accessory holder, comprising: an elongated hollow support member closed at one end and having a movable closure member at the other end to provide an inner chamber; and a cup-shaped member mounted on the upper end of the support member and having a bottom wall and side walls shaped to form therewith an annular outer chamber, said cup-shaped member having a movable cover shaped to close the annular outer chamber, the lateral surface of said support member being shaped to provide longitudinal flutes extending downwardly below said bottom wall throughout a major portion of the length of said support member, said lateral surface adjacent the upper ends of the flutes having notched portions adapted to receive the barbed end of fish hooks, and adjacent the lower ends of the flutes being provided with a laterally extending portion having slits adapted to receive and retain the free ends of snells stretched downwardly from the notched portions within the flutes.

2. A multi-purpose fishing accessory holder as specified in claim 1 in which the lateral surface of the support member beneath the laterally extending portion is shaped to provide a plurality of annular grooves so that the free ends of long snells may be wound within the grooves and anchored in one of the slits of the laterally extending portions.

3. A multi-purpose fishing accessory holder as specified in claim 1 in which the lateral surface of the support member between the ends of the flutes and the notched portions extends inwardly to provide a recessed portion in order to facilitate grasping a snelled hook held in position on the lateral surface of the support member.

4. A multi-purpose fishing accessory holder, comprising: an elongated hollow support member closed at one end and having a movable closure member at the other end to provide an inner chamber; a first cup-shaped member mounted on the upper end of the support member and having a bottom wall and side walls shaped to form therewith an annular outer chamber open at its upper end; and a second cup-shaped member mounted on the upper end of said support member above said first cup-shaped member and having a bottom wall and side walls shaped to form a second annular outer chamber with the support member, said cup-shaped member having a movable cover shaped to close the top of the second annular outer chamber, said second cup-shaped member being removably positioned on the support member and having its bottom wall of a configuration to close the open top of the first cup-shaped member, the lateral surface of said support member being shaped to provide longitudinal flutes extending downwardly below the bottom wall of the first cup-shaped member throughout a major portion of the length of the support member, said lateral surface adjacent the upper ends of the flutes having notched portions adapted to receive the barbed end of fish hooks and adjacent the lower ends of the flutes being provided with a laterally extending portion having slits adapted to receive and retain the free ends of snells stretched downwardly from the notched portions within the flutes, said notched portions bearing against said bottom wall of the second cup-shaped member to close the open ends of said notched portions.

5. A multi-purpose fishing accessory holder, comprising: an elongated hollow support member closed at one end and having a movable closure member at the other end to provide an inner chamber; and a cup-shaped member mounted on the upper end of the support member and having a bottom wall and side walls shaped to form therewith an annular outer chamber, said cup-shaped member having a movable cover shaped to close the annular outer chamber, the lateral surface of said support member being shaped to provide longitudinal flutes extending downwardly below said bottom wall throughout a major portion of the length of said support member, said lateral surface adjacent the upper ends of the flutes having a notched portion forming a plurality of notches with open ends for receiving the barbed ends of fish hooks, said bottom wall bearing against the notched portion to close the open end of said notches, the lateral surface of said support member adjacent the lower ends of the flutes being provided with a laterally extending portion having slits adapted to receive and retain the free ends of snells stretched downwardly from the notched portion within the flutes.

References Cited in the file of this patent

UNITED STATES PATENTS

| | | |
|---|---|---|
| 1,539,915 | Shebat | June 2, 1925 |
| 2,667,010 | Anderson | Jan. 26, 1954 |
| 2,763,956 | Olson | Sept. 25, 1956 |
| 2,765,576 | Kurek | Oct. 9, 1956 |